United States Patent [19]

Kubo et al.

[11] 4,200,560

[45] Apr. 29, 1980

[54] PROCESS FOR PREPARING WATER-SOLUBLE ALKYD RESINS

[75] Inventors: Masyoshi Kubo; Michio Nakanishi; Shoji Watanabe, all of Ohi, Japan

[73] Assignee: Daicel Ltd., Saikai, Japan

[21] Appl. No.: 895,560

[22] Filed: Apr. 12, 1978

[30] Foreign Application Priority Data

Apr. 13, 1977 [JP] Japan ................... 52-42780
Apr. 13, 1977 [JP] Japan ................... 52 42781
Apr. 13, 1977 [JP] Japan ................... 52 42782
Sep. 16, 1977 [JP] Japan ................... 52 112032

[51] Int. Cl.² .............. C08L 67/08; C08L 67/02; C08G 63/22
[52] U.S. Cl. ................. 260/22 EP; 260/29.2 EP; 260/29.4 R; 428/482; 525/441; 525/437; 525/448; 528/297; 528/286; 528/274
[58] Field of Search ............ 260/22 EP, 29.2 E, 850; 528/297, 304, 308

[56] References Cited

U.S. PATENT DOCUMENTS

| | | | |
|---|---|---|---|
| 3,397,255 | 8/1968 | Coats et al. ................ | 260/22 EP X |
| 3,427,266 | 2/1969 | Phillips et al. .............. | 260/22 EP |
| 4,054,614 | 10/1977 | Hoffman .................... | 260/29.2 E X |

FOREIGN PATENT DOCUMENTS

| | | | |
|---|---|---|---|
| 728716 | 2/1966 | Canada ................... | 528/297 |
| 2620726 | 11/1976 | Fed. Rep. of Germany ..... | 528/297 |
| 1298773 | 12/1972 | United Kingdom . | |

OTHER PUBLICATIONS

Rheineck et al., *J. Paint Tech.*, vol. 40 (1968), pp. 450–458.

*Primary Examiner*—Walter C. Danison
*Attorney, Agent, or Firm*—Sughrue, Rothwell, Mion, Zinn and Macpeak

[57] ABSTRACT

A process for preparing a water-soluble alkyd resin, which comprises (1) reacting
  (i) at least one of
    (a) a 1,2-epoxyalkane containing 6 to 28 carbon atoms,
    (b) a straight-chain internal epoxyalkane containing 6 to 20 carbon atoms,
    (c) a mixture of one or more of the 1,2-epoxyalkane (a) and/or the internal epoxyalkane (b), or
    (d) a mixture of one or more of the 1,2-epoxyalkane (a) and/or the internal epoxyalkane (b) and an unsaturated fatty acid containing 12 to 18 carbon atoms in a molar ratio of about 4:1 to about 2:1 of the 1,2-epoxyalkane (a) and/or the internal epoxyalkane (b) to the unsaturated fatty acid;

with

(ii) at least one of
    (a') an aromatic carboxyl compound selected from the group consisting essentially of phthalic anhydride, isophthalic acid, terephthalic acid, an ester of isophthalic acid and an ester of terephthalic acid,
    (b') a mixture of two or more of the aromatic carboxyl compounds (a'), or
    (c') a mixture of one or more of the aromatic carboxylic compounds (a') and an aliphatic dicarboxylic acid having 3 or more carbon atoms or an anhydride thereof; and
  (iii) a polyhydric alcohol containing 2 to 10 carbon atoms to form a polyester containing hydroxyl groups and having an acid value of about 5 or less, a hydroxyl value of about 40 to about 200 and an average molecular weight of about 600 to about 2,500;

(2) reacting the hydroxyl groups of the polyester with an aromatic polycarboxylic acid anhydride to adjust the acid value of the polyester to about 25 to about 80 and form a carboxyl group-containing alkyd resin; and (3) neutralizing the carboxyl group-containing alkyd resin with a base.

25 Claims, 1 Drawing Figure

4,200,560

PROCESS FOR PREPARING WATER-SOLUBLE ALKYD RESINS

BACKGROUND OF THE INVENTION

1. Field of the Invention

This invention relates to a process for producing a water-soluble alkyd resin using a 1,2-epoxyalkane or straight-chain internal epoxyalkane. This alkyd resin forms a cured product having superior resistance to yellowing and superior gloss as well as superior hardness and marked flexibility.

2. Description of the Prior Art

Water-soluble alkyd resins are obtained usually by treating oil-soluble resins to render them water-soluble. As is well known, oil and fat-modified water-soluble alkyd resins contain a fatty acid ester at a side chain and are obtained by reacting dicarboxylic acids such as phthalic anhydride, polyhydric alcohols such as glycerol and fatty acids or fatty acid glycerides. These types of alkyd resins are described in *Journal of Paint Technology*, Vol. 40, No. 525, pages 450 to 458 (October, 1968) and have been used extensively as resins for paints.

Baked coatings of paints obtained by using these oil and fat-modified alkyd resins as raw materials have excellent properties, but have the defect that they yellow markedly and have poor weatherability.

One known water-soluble alkyd resin prepared by using a 1,2-epoxyalkane is a reaction product of 1,2-octene oxide, phthalic anhydride and dipentaerythritol (e.g., as described in British Pat. No. 1,298,773). This alkyd resin is prepared by the ring-opening esterification of phthalic anhydride with dipentaerythritol and then the ring-opening esterification reaction of 1,2-octene oxide with the resulting product. Baked coatings from this resin are hard and brittle and this resin lacks compatibility with other resins. Hence, this resin is not entirely satisfactory as a resin for paints.

SUMMARY OF THE INVENTION

It has now been found that the defects of the prior art oil and fat-modified resins of marked yellowing and poor weatherability can be eliminated by using a 1,2-epoxyalkane or a straight-chain internal epoxyalkane as one component of the alcohol as a raw material for the alkyd resin instead of the unsaturated fatty acid which is a cause of these defects. This finding has led to the accomplishment of the present invention.

An object of this invention is to provide a process for producing a resin capable of producing coated films having superior properties by using phthalic anhydride or isophthalic acid as a main starting material in combination with an aliphatic dicarboxylic acid such as adipic acid and a 1,2-epoxyalkane or a straight-chain internal epoxyalkane having at least 6 carbon atoms and by conjointly employing a dehydro-esterification reaction which overcomes the prior art disadvantages and which is different from the reaction employed in the prior art.

Accordingly, this invention provides a process for preparing a water-soluble alkyd resin, which comprises (1) reacting
  (i) at least one of
    (a) a 1,2-epoxyalkane containing 6 to 28 carbon atoms,
    (b) a straight-chain internal epoxyalkane containing 6 to 20 carbon atoms,
    (c) a mixture of one or more of the 1,2-epoxyalkane (a) and/or the internal epoxyalkane (b), or
    (d) a mixture of one or more of the 1,2-epoxyalkane (a) and/or the internal epoxyalkane (b) and an unsaturated fatty acid containing 12 to 18 carbon atoms in a molar ratio of about 4:1 to about 2:1 of the 1,2-epoxyalkane (a) and/or the internal epoxyalkane (b) to the unsaturated fatty acid;
with
  (ii) at least one of
    (a') an aromatic carboxyl compound selected from the group consisting essentially of phthalic anhydride, isophthalic acid, terephthalic acid, an ester of isophthalic acid and an ester of terephthalic acid,
    (b') a mixture of two or more of the aromatic carboxyl compounds (a'), or
    (c') a mixture of one or more of the aromatic carboxylic compounds (a') and an aliphatic dicarboxylic acid having 3 or more carbon atoms or an anhydride thereof;
and
  (iii) a polyhydric alcohol containing 2 to 10 carbon atoms to form a polyester containing hydroxyl groups and having an acid value of about 5 or less, a hydroxyl value of about 40 to about 200 and an average molecular weight of about 600 to about 2,500;

(2) reacting the hydroxyl groups of the polyester with an aromatic polycarboxylic acid anhydride to adjust the acid value of the polyester to about 25 to about 80 and form a carboxyl group-containing alkyd resin; and

(3) neutralizing the carboxyl group-containing alkyd resin with a base.

DETAILED DESCRIPTION OF THE INVENTION

Examples of 1,2-epoxyalkanes containing 6 to 28 carbon atoms which can be used in the present invention include 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytetradecane, 1,2-epoxyhexadecane and 1,2-epoxyoctadecane, and these 1,2-epoxyalkanes can be represented by the general formula (I):

wherein n is an integer of from 3 to 25. Within this general formula (I), 1,2-epoxyalkanes with any number of carbon atoms can be used. However, to obtain alkyd resins with good water-solubility, 1,2-epoxyalkanes with 12 to 18, especially 12 to 14, carbon atoms are preferred. Preferred examples of 1,2-epoxyalkanes containing 12 to 18 carbon atoms which can be used in this invention include 1,2-epoxydodecane, 1,2-epoxytetradecane, 1,2-epoxyhexadecane and 1,2-epoxyoctadecane, and preferred examples of 1,2-epoxyalkanes containing 12 to 14 carbon atoms include 1,2-epoxydodecane and 1,2-epoxytetradecane. If the number of carbon atoms in the 1,2-epoxyalkane is 5 or less, the resulting alkyd resin has poor compatibility with other resins, and if the number of carbon atoms in the 1,2-epoxyalkane is 29 or more, coated films obtained from the resulting alkyd resin become undesirably soft. Industrially, these 1,2-epoxyalkanes are obtained by epoxidizing α-olefins obtained by the polymerization of ethylene, with organic peroxides such as peracetic acid or perbenzoic acid or other peroxides such as hydrogen peroxide, e.g., as described in U.S. Pat. No. 3,404,163.

The straight-chain internal epoxyalkane which can be used in this invention is an epoxyalkane in which 6 to 20 carbon atoms are bonded in a straight chain without branching and the oxirane oxygen is bonded to adjacent carbon atoms other than the terminal 1,2-positions (hereinafter "internal epoxyalkanes"). Examples of such internal epoxyalkanes which can be used in the present invention include 2,3-epoxyhexane, 3,4-epoxyoctane, 3,4-epoxydecane, 2,3-epoxyundecane, 3,4-epoxyundecane, 5,6-epoxydodecane, 3,4-epoxytridecane, 5,6-epoxytetradecane, 4,5-epoxyoctadecane, and 8,9-epoxyeicosane. These internal epoxyalkanes have the general formula (II):

(II)

wherein p and m represent 0 or a positive integer and satisfy the relationship $2 \leq m+p \leq 16$. Within this general formula (II), straight-chain internal epoxyalkanes with any number of carbon atoms can be used. For the preparation of especially good alkyd resins, internal epoxyalkanes having 8 to 14 carbon atoms are preferred.

These internal epoxyalkanes can be obtained, for example, by converting the corresponding n-paraffins into straight-chain internal olefins by catalytic dehydrogenation, and epoxidizing the straight-chain internal olefins with organic peroxides such as peracetic acid or perbenzoic acid or other peroxides such as hydrogen peroxide, e.g., as described in J.A.C.S., Vol. 87, page 3125 (1965).

These 1,2-epoxyalkanes or straight-chain internal epoxyalkanes can be used either individually or as a mixture of two or more thereof or one or more of the 1,2-epoxyalkanes and one or more of the internal epoxyalkanes can be used. Suitable unsaturated fatty acids which are used in this invention in combination with the 1,2-epoxyalkane and/or the internal epoxyalkane have 12 to 18 carbon atoms, preferably 16 to 18 carbon atoms. Especially preferred examples of unsaturated fatty acids include oleic acid, ricinoleic acid, linoleic acid, linolenic acid and eleosteric acid. These fatty acids can be used either individually or as a mixture of two or more thereof. For practical purposes, fatty acids obtained from soybean oil, castor oil, etc., composed mainly of unsaturated fatty acids are useful. The molar ratio of the 1,2-epoxyalkane or internal epoxyalkane to the unsaturated fatty acid is in the range of from about 4:1 to about 2:1.

Suitable aromatic carboxyl compounds which can be used also as a starting material in this invention include aromatic dicarboxylic acid compounds such as phthalic anhydride, isophthalic acid, terephthalic acid, and the esters of these aromatic dicarboxylic acid compounds with an alcohol having 1 to 3 carbon atoms such as dimethyl isophthalate, dimethyl terephthalate. 50 weight% or less of the aromatic carboxyl compounds can be replaced by an aliphatic dicarboxylic acid or anhydride thereof, preferably having 3 to 10 carbon atoms, such as adipic acid, maleic acid, maleic anhydride, succinic acid, glutaric acid, etc. In addition, a small amount of the aromatic dicarboxylic acids or the esters thereof may be replaced by an aromatic tricarboxylic acid such as trimellitic acid or the anhydride thereof, but if a large amount of the aromatic dicarboxylic acids or the esters thereof is replaced by a tricarboxylic acid or an anhydride thereof, an increase in viscosity and gelling occurs which is not desirable.

The polyhydric alcohols used in the present invention can have 2 to 10 carbon atoms and 2 or more hydroxy groups, preferably 2 to 6 carbon atoms and 2 to 4 hydroxy groups. Specific examples of polyhydric alcohols which can be used in this invention are dihydric alcohols such as ethylene glycol, propylene glycol, diethylene glycol and neopentyl glycol. Other examples of suitable polyhydric alcohols are trihydric alcohols such as glycerol, trimethylolethane and trimethylolpropane and tetrahydric alcohols such as pentaerythritol and diglycerol. These polyhydric alcohols can be used either individually or as a mixture of two or more thereof.

The molar ratio among the three starting materials used in this invention, i.e., the polycarboxylic acid, the polyhydric alcohol and the 1,2-epoxyalkane or straight-chain internal epoxyalkane, can be determined by applying the usual considerations employed in determining compositions for water-soluble alkyd resins. The molecular weight of the resulting resin is greatly determined by the ratio of the amount of the polycarboxylic acid as a source of supplying carboxyl groups to the amount of the alcohol and epoxide as a source of supplying hydroxyl groups. Furthermore, needless to say, free hydroxyl groups determined by the difference between these carboxyl groups and hydroxyl groups are required for curing using an amino resin, for example.

Another factor determining the molecular weight of the resin is the molar ratio of the polyhydric alcohols to each other. If a trihydric or more polyhydric alcohol is used in a larger quantity, the molecular weight of the resulting water-soluble alkyd resin increases, and the number of free hydroxyl groups also increases. Hence, a cured coating obtained by applying and baking a paint composition composed of the resulting resin and a curable resin such as a hexamethoxymethylated melamine resin is hard and brittle. On the other hand, if a dihydric alcohol is used in a larger amount, the resulting resin has a low molecular weight, and the number of free hydroxyl groups decreases. Thus, a cured coated film obtained by coating and baking a paint composition composed of the resulting resin and a curable resin such as a hexamethoxymethylated melamine becomes soft. The amount of the 1,2-epoxyalkane or the straight-chain internal epoxyalkane becomes a factor determining the proportion of side-chain alkyl groups of the alkyd resin, and dominates the properties of the cured coating.

A suitable amount of the 1,2-epoxyalkane or straight-chain internal epoxyalkane or a mixture thereof with the unsaturated fatty acid containing 12 to 18 carbon atoms is about 20 to about 50% by weight based on the weight of the water-soluble alkyd resin finally obtained.

On the basis of the above factors, the resin produced by this invention is a water-soluble alkyd resin having an average molecular weight of about 1,000 to about 3,000, preferably 1,000 to 2,000, and a hydroxyl value of about 40 to about 160, preferably 80 to 150, obtained by adjusting the molar ratio of the three starting materials, i.e., the polycarboxylic acid, the polyhydric alcohol and the 1,2-epoxyalkane or straight-chain internal epoxyalkane, the molar ratio between the polyhydric alcohols, and the molar ratio between the polycarboxylic acids. There is some degree of correlation between the average molecular weight and the hydroxyl value. When the average molecular weight of the resin is high, the hydroxyl value should be low, and when the average molecular weight of the resin is low, the hydroxyl value should be high. Usually, a suitable average molecular weight is 1,000 to 1,500, and a suitable hydroxyl value is 100 to 150.

The reaction for forming the alkyd resin comprises two steps. In the first step, while a mixture of the acid, i.e., the aromatic carboxyl compound, and the aliphatic dicarboxylic acid, if present, and polyhydric alcohol is being heated to about 100° to about 150° C. with stirring, the 1,2-epoxyalkane or the straight-chain internal epoxyalkane is gradually added to the mixture and reacted. Then, a solvent azeotroping with water such as xylene is added in an amount of about 5 to about 20% by weight, and while heating the mixture at about 150° to about 250° C. with stirring, water is removed from the reaction system. In this way, the dehydroesterification is allowed to proceed to produce a hydroxyl group-containing polyester having an acid value of about 5 or less. As a catalyst for promoting the reaction of the 1,2-epoxyalkane or the straight-chain internal epoxyalkane with the acid, i.e., the aromatic carboxyl compound, the aliphatic dicarboxylic acid, if present, and the unsaturated fatty acid, if present, an amine (especially, a tertiary amine, such as N,N-dimethylbenzylamine), a quaternary ammonium salt, such as tetramethylammonium chloride, a phosphine compound, or a complex of boron trifluoride and an ether or an amine, for example, can be used in an amount of about 0.01 to about 5% by weight, preferably 0.1 to 1.0% by weight, based on the weight of the 1,2-epoxyalkane or the straight-chain internal epoxyalkane.

In the above reaction, better results are obtained in the color of the resulting resin with lower reaction temperatures. A preferred temperature ranges from 160° to 180° C. to minimize yellowing, and yet achieve a suitable reaction rate for the esterification. The same effect is produced by passing an inert gas such as nitrogen into the reaction mixture during the reaction.

While the reaction time in this first step will vary, in general, a suitable reaction time has been found to be about 13 to 15 hours.

The second step of the reaction comprises adding an acid anhydride such as phthalic anhydride or trimellitic anhydride to the hydroxyl-containing polyester obtained in the first step, heating the mixture at about 100° to about 150° C. with stirring to obtain a carboxyl group-containing alkyd resin. When this alkyd resin has an acid value of at least about 25, the resin becomes soluble in water by the addition of a partially or completely water-miscible organic solvent and neutralization with a base to a pH of 7.0 to 9.0. Generally, alkyd resins having an acid value of about 25 to about 80 are suitable.

Examples of suitable bases which can be used in this invention are organic amines such as alkylamines (e.g., monomethylamine, dimethylamine, trimethylamine, monoethylamine, diethylamine, triethylamine, monoisopropylamine, diisopropylamine or butylamines), alcohol amines (e.g., monoethanolamine, diethanolamine, triethanolamine, diethylaminoethanol or dimethylaminopropanol), and cyclic amines (e.g., morpholine or pyridine); and inorganic bases such as ammonia or sodium hydroxide.

Useful organic solvents which can be used include ethylene glycol monomethyl ether, ethylene glycol monoethyl ether, ethylene glycol monobutyl ether, cyclohexanone, cyclooctanone, cyclododecanone, n-butanol, isobutanol, sec-butanol and tert-butanol.

The water-solubilization treatment of the alkyd resin obtained in the second step is carried out by dissolving the alkyd resin in at least one partially or completely water-miscible organic solvent of the types exemplified above. A suitable weight ratio of the alkyd resin to the partially or completely water-miscible organic solvent ranges from 3:1 to 1:1. A base is then added to the extent of neutralization and the resulting neutralized alkyd resin solution is diluted with water. A suitable temperature for the neutralization ranges from about 0° C. to about 50° C. Of course, the viscosity of the solution is most dependent upon the molecular weight of the alkyd resin. The viscosity is also determined depending on the type and amount of the organic solvent used.

While the reaction time will vary in the second and third steps, a suitable reaction time has been found to be about 2 to 3 hours and about 1 to 3 hours, respectively.

An amino resin is used as a curing agent for preparing a heat curable enamel from the resulting water-soluble alkyd resin. Examples of suitable amino resins which can be used are hydrophilic amino resins which are etherified with lower aliphatic alcohols with 4 or less carbon atoms, such as a methyl-etherified melamine resin, a methyl-etherified urea melamine cocondensed resin or a partially butyl-etherified melamine resin.

By heating the resulting aminoalkyd heat curable enamel comprising the water-soluble alkyd resin and the amino resin to about 80° to about 200° C., cured coated films having excellent resistance to yellowing and having excellent weatherability as well as superior hardness and outstanding flexibility can be obtained. Conventional additives to alkyd resins well known in the art can also be added to the alkyd resin composition of this invention.

The following Examples and Comparative Examples are given to illustrate the present invention in greater detail. In the following Examples, all parts, ratios and percentages are by weight unless otherwise indicated.

EXAMPLE 1

A mixture of 85.2 parts of phthalic anhydride, 25.6 parts of adipic acid, 5.2 parts of neopentyl glycol and 39.1 parts of glycerol was heated at 120° C. for 30 minutes with stirring in a 500 cc four-necked flask equipped with a separatory tube, a thermometer, a stirrer and a gas inlet, while passing nitrogen gas into the flask.

105 parts of AOE X24 (a trademark for a mixture of 1,2-epoxydodecane and 1,2-epoxytetradecane having an epoxy equivalent of 208, a product made by Daicel Ltd.) and 0.32 part of N,N-dimethylbenzylamine at the same temperature were added dropwise to the above-mixture over the course of 2.5 hours. Then, the resulting mixture was heated with stirring at 160° C. for 4 hours, and at 180° C. for 6 hours. Water (10.0 parts) distilled out, and a resin having an acid value of 0.93 was obtained.

Then, 29.6 parts of phthalic anhydride was added to the resulting resin, and the mixture was heated at 130° C. for 2 hours to increase the acid value to 43.9.

Butyl Cellosolve (20.7 parts) and 20.7 parts of t-butanol were added to 90 parts of the resulting resin having an acid value of 43.9, and the materials were well mixed. Then, 7.2 parts of triethylamine was added to the mixture, followed by further adding 41.4 parts of water to produce 180 parts of an aqueous solution of the resin. The solution had a viscosity of 440 centipoises (measured at 25° C.) using a Brookfield viscometer (produced by Tokyo Keiki Co., Ltd.) with Rotor No. 2 and a rotation speed of 12 r.p.m., hereinafter the same, and a pH of 7.02.

The resin solution, hexamethoxymethylated melamine (Sumimal M-50W, a trademark for a product of Sumitomo Chemical Co., Ltd.) and rutile type titanium oxide (Tipaque R-820, a trademark for a product of Ishihara Sangyo Co., Ltd.) were mixed in a weight ratio of 48:12:40 as solids in a ball mill to form an aminoalkyd white enamel.

Figure 1:
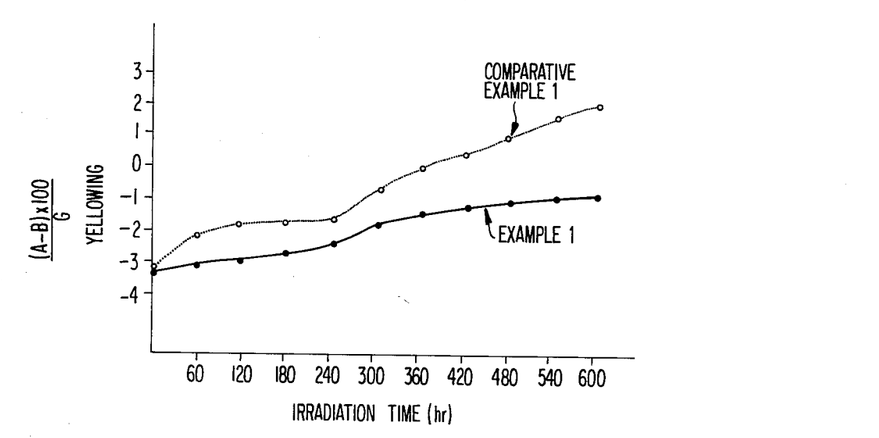
The figure is a graphical representation showing the changes in the degree of yellowing versus irradiation time for a water-soluble alkyd resin of this invention produced in Example 1, given hereinafter, and for a comparative resin produced in Comparative Example 1, given hereinafter.

The enamel was coated on a thin mild steel plate and a tin plate, and baked at 40° C. for 30 minutes and subsequently at 120° C. for 30 minutes to form a coated film having a thickness of 30 microns. The properties of the coated film are shown in Table 1 below and the FIGURE. The FIGURE is a graphical representation showing the changes of the degree of yellowing versus irradiation time when a coated and baked film of the water-soluble alkyd resin of this invention is subjected to an artificial accelerated weatherability test.

EXAMPLE 2

A mixture of 59.2 parts of phthalic anhydride, 29.2 parts of adipic acid, 41.6 parts of neopentyl glycol and 26.8 parts of trimethylolpropane was reacted with 40 parts of AOE X24 and 0.12 part of N,N-dimethylbenzylamine under the same conditions as in Example 1 to produce a resin having an acid value of 0.82.

Phthalic anhydride (29.6 parts) was added to the resin, and the mixture was heated at 130° C. to produce a resin having an acid value of 54.6.

Butyl Cellosolve (20.3 parts) and 20.3 parts of t-butanol were added to 90 parts of the resin having an acid value of 54.6, and these materials were thoroughly mixed. Then, 8.8 parts of triethylamine was added, and further 40.6 parts of water was added to produce 180 parts of an aqueous solution of the resin. The resin solution had a viscosity of 465 centipoises measured at 25° C. and a pH of 8.05.

An aminoalkyd white enamel was prepared using the same formulation as in Example 1. A coated film prepared from the resin and then baked had the properties shown in Table 1 below.

EXAMPLE 3

A mixture of 74.1 parts of phthalic anhydride, 24.4 parts of adipic acid and 38.4 parts of glycerol was reacted with 83.3 parts of AOE X24 and 0.25 part of N,N-dimethylbenzylamine under the same conditions as in Example 1 to produce a resin having an acid value of 1.74.

Then, 29.6 parts of phthalic anhydride was added to this resin, and the mixture was heated at 130° C. to produce a resin having an acid value of 48.6.

To 90 parts of this resin were added 20.5 parts of butyl Cellosolve and 20.5 parts of t-butanol, and these materials were thoroughly mixed. Then, 8.0 parts of triethylamine was added and, further, 41.0 parts of water was added to produce 180 parts of an aqueous solution of the resin. The resin solution had a viscosity of 490 centipoises measured at 25° C. and a pH of 7.88.

Using the same formulation as in Example 1, an aminoalkyd white enamel was prepared. A coated film prepared from the enamel and then baked had the properties shown in Table 1 below.

EXAMPLE 4

A mixture of 59.2 parts of phthalic anhydride, 29.2 parts of adipic acid, 41.6 parts of neopentyl glycol and 26.8 parts of trimethylolpropane was reacted with 43.6 parts of AOE X68 (a trademark for a mixture of 1,2-epoxyhexadecane and 1,2-epoxyoctadecane having an epoxy equivalent of 218; a product of Daicel Ltd.) and 0.13 part of N,N-dimethylbenzylamine under the same conditions as in Example 1 to produce a resin having an acid value of 0.91. Then, 29.6 parts of phthalic anhydride was added to this resin, and the mixture was heated at 130° C. to produce a resin having an acid value of 50.4.

To 90 parts of the resin having an acid value of 50.4 were added 20.5 parts of butyl Cellosolve and 20.5 parts of t-butanol, and the materials were thoroughly mixed. Then, 8.2 parts of triethylamine and, further, 40.9 parts of water were added to produce 180 parts of an aqueous solution of the resin. The solution had a viscosity of 485 centipoises (measured at 25° C.) and a pH of 8.05.

An aminoalkyd white enamel was prepared from the resulting resin solution using the same formulation as in Example 1, and the properties of a coated film prepared from the enamel and then baked are shown in Table 1 below.

COMPARATIVE EXAMPLE 1

An oil and fat-modified water-soluble alkyd resin having a fatty acid ester side chain was synthesized for the purposes of comparison.

A mixture of 111.1 parts of phthalic anhydride, 92.1 parts of glycerol and 140.0 parts of soybean oil fatty acid was reacted under the same conditions as in Example 1 to produce a resin having an acid value of 0.98.

Then, 37.0 parts of phthalic anhydride was added to this resin, and the mixture was heated at 130° C. to produce a resin having an acid value of 44.8.

To 90 parts of the resin having an acid value of 44.8 were added 20.7 parts of butyl Cellosolve and 20.7 parts of t-butanol, and the materials were thoroughly mixed. Then, 7.3 parts of triethylamine was added, followed by further adding 41.4 parts of water to produce 180 parts of an aqueous solution of the resin. The resin solution had a viscosity of 575 centipoises (measured at 25° C.) and a pH of 8.32.

An aminoalkyd white enamel was prepared using the same formulation as in Example 1, and the variation in the degree of yellowing with time of a coated film prepared from the enamel and then baked was examined. The results are shown in the FIGURE.

COMPARATIVE EXAMPLE 2

A mixture of 88.9 parts of phthalic anhydride, 41.6 parts of neopentyl glycol and 26.8 parts of trimethylolpropane was reacted with 40 parts of AOE X24 and 0.12 part of N,N-dimethylbenzylamine under the same conditions as in Example 1 to produce a resin having an acid value of 1.02.

To this resin was added 29.6 parts of phthalic anhydride, and the mixture was heated at 130° C. to increase the acid value to 55.1.

To 90 parts of the resin having an acid value of 55.1 were added 20.3 parts of butyl Cellosolve and 20.3 parts of t-butanol, and the materials were well mixed. Then, 8.8 parts of triethylamine and, further, 40.6 parts of water were added to produce 180 parts of an aqueous solution of the resin. The resin solution had a viscosity of 485 centipoises (measured at 25° C.) and a pH of 8.00.

An aminoalkyd white enamel was prepared from the resin solution using the same formulation as in Example 1. The properties of a coated film prepared from the enamel and then baked are shown in Table 1 below.

COMPARATIVE EXAMPLE 3

A mixture of 111.1 parts of phthalic anhydride and 21.2 parts of dipentaerythritol was heated with stirring at 120° C. for 30 minutes in the same type of apparatus as described in Example 1.

Then, at the same temperature, 100 parts of AOE X24 and 0.3 part of N,N-dimethylbenzylamine were added dropwise to the mixture over the course of 2 hours and 30 minutes. Heating with stirring was continued to produce a resin having an acid value of 66.1.

To 90 parts of this resin were added 19.8 parts of butyl Cellosolve and 19.8 parts of t-butanol, and the materials were thoroughly mixed. Then, 10.7 parts of triethylamine was added and 39.7 parts of water was further added to produce an aqueous solution of the resin. The resin solution had a viscosity of 420 centipoises (measured at 25° C.) and a pH of 8.12.

An aminoalkyd white enamel was prepared from the resin solution using the same formulation as in Example 1. The properties of a coated film obtained from the enamel and then baked are shown in Table 1.

TABLE 1

| Evaluation | Example 1 | Example 2 | Example 3 | Example 4 | Comparative Example 2 | Comparative Example 3 |
|---|---|---|---|---|---|---|
| Gloss (reflection on a mirror surface at 60°) | 90.1 | 81.9 | 88.4 | 89.3 | 90.2 | 73.2 |
| Pencil Hardness | H | 2H | H | H | 2H | H |
| Crosscut Test | Good | Good | Good | Good | Fair | Fair to Poor |
| Sketch Test | Good | Excellent | Good | Good | Fair | Fair to Poor |
| Impact Resistance Test (500 g · cm) | 50 | 40 | 50 | 50 | 10 | 15 |
| Bending Test (φ mm) | 2 | 2 | 2 | 2 | Above 8 | Above 8 |
| Erichsen Test (mm) | 8.52 | 8.48 | 7.54 | 8.75 | 3.02 | 5.10 |

Note: The tests for evaluating the characteristics of the coated film were performed in accordance with JIS K-5400. The evaluations in the crosscut test and the sketch test were expressed using four grades, i.e., excellent, good, fair and poor.

EXAMPLE 5

A mixture of 71.9 parts of phthalic anhydride, 12.5 parts of adipic acid, 17.8 parts of neopentyl glycol, 30.3 parts of glycerol and 20 parts of soybean oil fatty acid (neutralization value: 199.1) was heated at 120° C. for 30 minutes in the same type of flask as used in Example 1 while passing nitrogen gas through the flask.

At the same temperature, 42.9 parts of AOE X24 and 0.13 part of N,N-dimethylbenzylamine were added dropwise to the mixture over the course of two hours. The mixture was heated with stirring at 160° C. for 4 hours and at 180° C. for 6 hours. Water (10.1 parts) was distilled off, and a resin having an acid value of 0.99 was obtained.

Then, 27.5 parts of phthalic anhydride was added to the resulting resin, and the mixture was heated at 130° C. for 2 hours to increase the acid value to 48.8.

To 90 parts of the resin having an acid value of 48.8 were added 20.5 parts of butyl Cellosolve and 20.5 parts of t-butanol, and the materials were thoroughly mixed. Then, 8.0 parts of triethylamine was added and, further, 41.0 parts of water was added thereto to produce 180 parts of an aqueous solution of the resin. Then resin solution had a viscosity of 430 centipoises (measured at 25° C.) and a pH of 8.15.

An aminoalkyd white enamel was prepared from the resin solution using the same formulation as in Example 1. The properties of a coated film prepared from the enamel and then baked are shown in Table 2 below. The coated film was subjected to artificial accelerated weatherability testing for 600 hours, and then the degree of yellowing was measured. No marked change in yellowing with time was noted as in the case of a resin which did not contain a soybean oil fatty acid.

EXAMPLE 6

A mixture of 71.9 parts of phthalic anhydride, 12.5 parts of adipic acid, 17.8 parts of neopentyl glycol, 30.3 parts of glycerin and 30 parts of a soybean oil fatty acid was reacted with 42.9 parts of AOE X24 and 0.13 part of N,N-dimethylbenzylamine under the same conditions as in Example 5 to produce a resin having an acid value of 0.81.

To the resulting resin was added 27.5 parts of phthalic anhydride, and the mixture was heated at 130° C. to increase the acid value to 45.3.

To 90 parts of the resin having an acid value of 45.3 were added 20.7 parts of butyl Cellosolve and 20.7 parts of t-butanol, and the materials were thoroughly mixed, followed by adding 7.4 parts of triethylamine. Further, 41.3 parts of water was added to produce 180 parts of an aqueous solution of the resin. The resin solution had a viscosity of 472 centipoises (measured at 25° C.) and a pH of 8.08.

An aminoalkyd white enamel was prepared from the resin solution using the same formulation as in Example 1, and the properties of a coated film of the enamel which was baked are shown in Table 2 below. The coated film was subjected to artificial accelerated weatherability testing for 600 hours, and then, the degree of yellowing was measured. No marked change with time was noted as was the case with a resin which did not contain a soybean oil fatty acid.

EXAMPLE 7

A mixture of 71.9 parts of phthalic anhydride, 12.5 parts of adipic acid, 17.8 parts of neopentyl glycol, 30.3 parts of glycerol and 15 parts of soybean oil fatty acid was reacted with 42.9 parts of AOE X24 and 0.13 part of N,N-dimethylbenzylamine under the same conditions as in Example 5 to produce a resin having an acid value of 0.96.

Then, 27.5 parts of phthalic anhydride was added to the resulting resin, and the mixture was heated at 130° C. to increase the acid value to 50.7.

To 90 parts of the resin having an acid value of 50.7 were added 20.5 parts of butyl Cellosolve and 20.5 parts of t-butanol. The materials were well mixed, and then 8.2 parts of triethylamine were added. Further, 40.9 parts of water was added to produce 180 parts of an aqueous solution of the resin. The resin solution had a viscosity of 460 centipoises (measured at 25° C.) and a pH of 7.98.

An aminoalkyd white enamel was prepared from the resin solution using the same formulation as in Example 1, and the properties of a coated film prepared from the enamel and then baked are shown in Table 2 below. The coated film was subjected to artificial accelerated weatherability testing for 600 hours, and the degree of yellowing was measured. No marked change with time was observed as was the case with a resin which did not contain soybean oil fatty acid.

EXAMPLE 8

A mixture of 71.9 parts of phthalic anhydride, 12.5 parts of adipic acid, 17.8 parts of neopentyl glycol, 30.3 parts of glycerol and 20 parts of soybean fatty acid was reacted with 46.8 parts of AOE X68 and 0.14 part of N,N-dimethylbenzylamine under the same conditions as in Example 5 to produce a resin having an acid value of 0.95.

To the resulting resin was added 27.5 parts of phthalic anhydride, and the mixture was heated at 130° C. to increase the acid value to 42.9. To 90 parts of the resin having an acid value of 42.9 were added 20.8 parts of butyl Cellosolve and 20.8 parts of t-butanol, and the materials were well mixed. Then, 7.0 parts of triethylamine was added, and 41.5 parts of water was added to produce 180 parts of an aqueous solution of the resin. The resin solution had a viscosity of 446 centipoises (measured at 25° C.) and a pH of 8.33. An aminoalkyd white enamel was prepared from the resin solution using the same formulation as in Example 1, and the properties of a baked coated film from the enamel are shown in Table 2 below. The coated film was also subjected to artificial accelerated weatherability testing for 600 hours, and the degree of yellowing was measured. No marked change with time was noted as was the case of a resin which did not contain soybean oil fatty acid.

TABLE 2

| Evaluation | Example | | | |
|---|---|---|---|---|
| | 5 | 6 | 7 | 8 |
| Gloss (reflection on a mirror surface at 60°) | 91.4 | 90.1 | 92.3 | 90.4 |
| Pencil Hardness | 2H | H | 3H | 2H |
| Crosscut Test | Excellent | Excellent | Excellent | Excellent |
| Sketch Test | Excellent | Excellent | Excellent | Excellent |
| Impact Resistance Test (500 g · cm) | 50 | 50 | 50 | 50 |
| Bending Test ($\phi$ mm) | 2 | 2 | 2 | 2 |
| Erichsen Test (mm) | 9.65 | 9.90 | 9.03 | 9.73 |

Note: The evaluations of properties of the coated films were the same as those shown in the footnote to Table 1.

EXAMPLE 9

A mixture of 72.0 parts of isophthalic acid, 34.1 parts of adipic acid, 72.6 parts of neopentyl glycol and 14.7 parts of trimethylolpropane was heated at 140° C. for 1 hour with stirring the same type of flask as used in Example 1 while passing nitrogen gas through the flask. Then, at the same temperature, 58.7 parts of AOE X24 and 0.18 parts of N,N-dimethylbenzylamine were added dropwise over the course of 1 hour. Then, the temperature was increased, gradually, to 230° C. over the course of 5 hours. To perform further esterification, the reaction was performed at 230° C. for 2 hours. Water (28.9 parts) was distilled out to produce a resin having an acid value of 0.94.

Then, 22.4 parts of trimellitic anhydride was added to the resulting resin, and the mixture was heated at 140° C. for 2 hours to increase the acid value to 50.3.

To 90 parts of the resin having an acid value of 50.3 were added 20.5 parts of butyl Cellosolve and 20.5 parts of t-butanol, and the materials were well mixed. Then, 8.0 parts of triethylamine was added, and 41.0 parts of water was further added to produce 180 parts of an aqueous solution of the resin. The resin solution had a viscosity of 480 centipoises (measured at 28° C.) An aminoalkyd white enamel was prepared from the resin solution using the same formulation as in Example 1. The properties of a coated film prepared from the enamel and then baked are shown in Table 3 below.

EXAMPLE 10

A mixture of 95.5 parts of isophthalic acid, 25.6 parts of adipic acid, 17.7 parts of neopentyl glycol and 49.2 parts of trimethylolpropane was reacted with 118.7 parts of AOE X24 and 0.36 part of N,N-dimethylbenzylamine under the same conditions as in Example 9 to produce a resin having an acid value of 0.88. Then, 32.0 parts of trimellitic anhydride was added to the resulting solution, and the mixture was heated at 140° C. to increase the acid value to 41.1.

To 90 parts of this resin having an acid value of 41.1 were added 21.2 parts of butyl Cellosolve and 21.2 parts of t-butanol, and the materials were well mixed. Then, 5.4 parts of triethylamine and 42.2 parts of water were added to produce 180 parts of an aqueous solution of the resin. The resin solution had a viscosity of 3,500 centipoises (measured at 25° C.) and a pH of 8.86. An aminoalkyd white enamel was prepared from the resin solution using the same formulation shown in Example 1. The properties of a coated film prepared from the enamel and then baked are shown in Table 3 below.

EXAMPLE 11

A mixture of 72.0 parts of isophthalic acid, 34.1 parts of adipic acid, 72.6 parts of neopentyl glycol and 14.7 parts of trimethylolpropane was reacted with 64.0 parts of AOE X68 and 0.18 part of N,N-dimethylbenzylamine under the same conditions as in Example 9 to produce a resin having an acid value of 0.64.

Then, 22.4 parts of trimellitic anhydride was added to the resin having an acid value of 0.64, and the mixture was heated to 140° C. to increase the acid value to 43.3.

To 90 parts of the resulting resin were added 20.8 parts of butyl Cellosolve and 20.8 parts of t-butanol, and the materials were well mixed. Then, 7.0 parts of triethylamine and further 41.5 parts of water were added to produce 180 parts of an aqueous solution of the resin. The resin solution had a viscosity of 525 centipoises (measured at 25° C.) and a pH of 8.44. An aminoalkyd white enamel was prepared from the resin solution using the same formulation as in Example 1. The properties of a coated film prepared from the enamel and then baked are shown in Table 3 below.

EXAMPLE 12

A mixture of 110.7 parts of isophthalic acid and 70.7 parts of neopentyl glycol was reacted with 90.4 parts of AOE X24 and 0.27 part of N,N-dimethylbenzylamine under the same conditions as in Example 9 to produce a resin having an acid value of 1.33.

To the resulting resin was added 22.4 parts of trimellitic anhydride, and the mixture was heated at 140° C. to increase the acid value to 49.5. To 90 parts of the resin having an acid value of 49.5 were added 20.5 parts of butyl Cellosolve and 20.5 parts of t-butanol, and the materials were well mixed. Then, 8.0 parts of triethylamine was added, and further 41.0 parts of water was added to produce 180 parts of an aqueous solution of the resin. The resin solution had a viscosity of 914 centipoises (measured at 25° C.) and a pH of 8.81. An aminoalkyd white enamel was prepared from the resin solution using the same formulation as in Example 1. The properties of a coated film prepared from the enamel and then baked are shown in Table 3 below.

EXAMPLE 13

A mixture of 84.2 parts of dimethyl isophthalate, 34.1 parts of adipic acid, 72.6 parts of neopentyl glycol and 14.7 parts of trimethylolpropane was reacted with 58.7 parts of AOE X24 and 0.18 part of N,N-dimethylbenzylamine under the same conditions as in Example 9 to produce a resin having an acid value of 0.67. Then, 22.4 parts of trimellitic anhydride was added to this resin, and the mixture was heated at 140° C. to increase the acid value to 46.4.

To 90 parts of the resin having an acid value of 46.4 were added 20.6 parts of butyl Cellosolve and 20.6 parts of t-butanol, and the materials were well mixed. Then, 7.5 parts of triethylamine was added, and 41.2 parts of water was further added to produce 180 parts of an aqueous solution of the resin. The resin solution had a viscosity of 235 centipoises (measured at 25° C.) and a pH of 9.00. An aminoalkyd white enamel was prepared from the resin solution using the same formulation as in Example 1, and the properties of a coated film prepared from the enamel and then baked are shown in Table 3 below.

TABLE 3

| Evaluation | Example 9 | 10 | 11 | 12 | 13 |
|---|---|---|---|---|---|
| Storage Stability (40° C., 100 days) | Excellent | Excellent | Excellent | Excellent | Excellent |
| Gloss (reflection on a mirror surface at 60°) | 92.9 | 94.2 | 91.5 | 90.5 | 89.4 |
| Pencil Hardness | 2H | 3H | 2H | H | 2H |
| Crosscut Test | Excellent | Excellent | Excellent | Excellent | Excellent |
| Sketch Test | Excellent | Excellent | Excellent | Excellent | Excellent |
| Impact Resistance Test (500 g · cm) | 50 | 50 | 50 | 40 | 50 |
| Bending Test ($\phi$ mm) | 2 | 2 | 2 | 2 | 2 |
| Erichsen Test (mm) | 9.53 | 9.90 | 9.85 | 10.45 | 9.61 |

Note: The evaluations of the properties of the coated films were the same as those shown in the footnote to Table 1.

EXAMPLE 14

A mixture of 72.0 parts of isophthalic acid, 34.1 parts of adipic acid, 72.6 parts of neopentyl glycol and 14.7 parts of trimethylolpropane was heated at 140° C. for 1 hour with stirring in the same type of flask as used in Example 1 while passing nitrogen gas through the flask.

64.0 parts of a mixture of straight-chain internal epoxyalkanes with 11 to 14 carbon atoms (having an epoxy equivalent of 203) and 0.18 part of N,N-dimethylbenzylamine were added dropwise at the same temperature over the course of 1 hour. The temperature was gradually increased, and finally to 230° C. over the course of 5 hours. To perform further esterification, the reaction was performed at 230° C. for 2 hours. Water (27.3 parts) distilled out to produce a resin having an acid value of 0.68. Then, 22.4 parts of trimellitic anhydride was added to the resulting resin, and the mixture was heated at 140° C. for 2 hours to increase the acid value to 47.3.

To 90 parts of the resin having an acid value of 47.3 were added 20.6 parts of t-butanol and 20.6 parts of butyl Cellosolve, and the materials were well mixed. Then, 7.7 parts of triethylamine was added, and 41.2 parts of water was further added to produce 180 parts of an aqueous solution of the resin. The resin solution had a viscosity of 285 centipoises (measured at 28° C.). An aminoalkyd white enamel was prepared from the resin solution using the same formulation as in Example 1, and the properties of a coated film prepared from the enamel and then baked are shown in Table 4 below.

EXAMPLE 15

A mixture of 70.6 parts of isophthalic acid, 47.5 parts of adipic acid, 43.0 parts of neopentyl glycol and 36.9 parts of trimethylolpropane was reacted with 89.9 parts of a mixture of straight-chain internal epoxyalkanes with 11 to 14 carbon atoms (epoxy equivalent: 203) and 0.27 part of N,N-dimethylbenzylamine under the same conditions as in Example 14 to produce a resin having an acid value of 2.3. Then, 19.2 parts of trimellitic anhydride was added to the resin, and the mixture was heated to 140° C. to increase the acid value to 37.9.

To 90 parts of the resulting resin having an acid value of 37.9 were added 21.0 parts of butyl Cellosolve and 21.0 parts of t-butanol, and the materials were well mixed. Triethylamine (6.2 parts) was added, and further 41.9 parts of water was added to produce 180 parts of an aqueous solution of the resin. The resin solution had a viscosity of 281 centipoises (measured at 28° C.) and a pH of 8.9.

An aminoalkyd white enamel was prepared from the resin solution using the same formulation as in Example 1, and the properties of a coated film prepared from the enamel and then baked are shown in Table 4 below.

EXAMPLE 16

A mixture of 70.6 parts of terephthalic acid, 47.5 parts of adipic acid, 43.0 parts of neopentyl glycol and 36.9 parts of trimethylolpropane was reacted with 89.9 parts of a mixture of straight-chain internal epoxyalkanes with 11 to 14 carbon atoms (epoxy equivalent: 203) and 0.27 part of N,N-dimethylbenzylamine under the same conditions as in Example 14 to produce a resin having an acid value of 0.96. Then, 19.2 parts of trimellitic anhydride was added to the resin, and the mixture was heated to 140° C. to increase the acid value to 40.1.

To 90 parts of the resulting resin having an acid value of 40.1 were added 20.9 parts of butyl Cellosolve and 20.9 parts of t-butanol, and the materials were well mixed. Then, 6.5 parts of triethylamine was added, and 41.8 parts of water was further added to produce 180 parts of an aqueous solution of the resin. The resin solution had a viscosity of 244 centipoises (measured at 28° C.) and a pH of 8.8.

An aminoalkyd white enamel was prepared from the resin solution using the same formulation as in Example 1. The properties of a coated film prepared from the enamel and then baked are shown in Table 4 below.

EXAMPLE 17

A mixture of 84.2 parts of dimethyl isophthalate, 34.1 parts of adipic acid, 72.6 parts of neopentyl glycol and 14.7 parts of trimethylolpropane was reacted with 64.0 parts of a mixture of straight-chain internal epoxyalkanes with 11 to 14 carbon atoms (epoxy equivalent: 203) and 0.18 part of N,N-dimethylbenzylamine under the same conditions as in Example 14 to produce a resin having an acid value of 0.88. Then, 22.4 parts of trimellitic anhydride was added to the resulting resin, and the mixture was heated at 140° C. to increase the acid value to 45.9.

To 90 parts of the resulting resin having an acid value of 45.9 were added 20.6 parts of butyl Cellosolve and 20.6 parts of t-butanol, and the materials were well mixed. Then, 7.5 parts of triethylamine was added, and 41.3 parts of water was further added to produce 180 parts of an aqueous solution of the resin. The resin solution had a viscosity of 296 centipoises (measured at 28° C.) and a pH of 8.6.

An aminoalkyd white enamel was prepared from the resin solution using the same formulation as in Example 1. The properties of a coated film prepared from the enamel and then baked are shown in Table 4 below.

EXAMPLE 18

A mixture of 85.2 parts of phthalic anhydride, 25.6 parts of adipic acid, 5.2 parts of neopentyl glycol and 39.1 parts of glycerol was reacted with 114.5 parts of a mixture of straight-chain internal epoxyalkanes with 11 to 14 carbon atoms (epoxy equivalent: 203) and 0.32 part of N,N-dimethylbenzylamine under the same conditions as in Example 14 to produce a resin having an acid value of 2.26. To the resulting resin was added 29.6 parts of phthalic anhydride, and the mixture was heated at 140° C. to increase the acid value to 40.0.

To 90 parts of the resin having an acid value of 40.0 were added 20.9 parts of butyl Cellosolve and 20.9 parts of t-butanol, and the materials were well mixed. Then, 6.5 parts of triethylamine was added, and further 41.8 parts of water was added to produce 180 parts of an aqueous solution of the resin. The resin solution had a viscosity of 275 centipoises (measured at 28° C.) and a pH of 8.6.

An aminoalkyd white enamel was prepared from the resin solution using the same formulation as in Example 1. The properties of a coated film prepared from the white enamel and then baked are shown in Table 4 below.

TABLE 4

| Evaluation | Example 14 | Example 15 | Example 16 | Example 17 | Example 18 |
|---|---|---|---|---|---|
| Gloss (reflection on a mirror surface at 60°) | 91.7 | 91.9 | 90.1 | 91.1 | 90.0 |
| Pencil Hardness | 2H | 3H | 2H | 2H | 2H |
| Crosscut Test | Excellent | Excellent | Excellent | Excellent | Good |
| Sketch Test | Excellent | Excellent | Excellent | Excellent | Excellent |
| Impact Resistance Test (500 g · cm) | 45 | 50 | 50 | 50 | 50 |
| Bending Test (φ mm) | 2 | 2 | 2 | 2 | 2 |
| Erichsen Test (mm) | 8.26 | 8.37 | 8.05 | 8.33 | 8.00 |
| Resistance to NaOH (5%, 20° C., 24 hrs.) | Excellent | Excellent | Excellent | Excellent | Good |
| Sulfuric Acid Resistance (5%, 20° C., 24 hrs.) | Excellent | Excellent | Excellent | Excellent | Excellent |
| Water Resistance (40° C., 24 hrs.) | Excellent | Excellent | Excellent | Excellent | Excellent |
| Storage Stability (40° C., 100 days) | Excellent | Excellent | Excellent | Excellent | Good |

*Note: The evaluations of the properties of the coated films were the same as those shown in the footnote to Table 1.

While the invention has been described in detail and with reference to specific embodiments thereof, it will be apparent to one skilled in the art that various changes and modifications can be made therein without departing from the spirit and scope thereof.

What is claimed is:

1. A process for preparing a water-soluble alkyd resin, which comprises
   (1) reacting
      (i) at least one of
         (a) a 1,2-epoxyalkane containing 6 to 28 carbon atoms,
         (b) a straight-chain internal epoxyalkane containing 6 to 20 carbon atoms,
         (c) a mixture of one or more of the 1,2-epoxyalkane (a) and/or the internal epoxyalkane (b), or
         (d) a mixture of one or more of the 1,2-epoxyalkane (a) and/or the internal epoxyalkane (b) and an unsaturated fatty acid containing 12 to 18 carbon atoms in a molar ratio of about 4:1 to about 2:1 of the 1,2-epoxyalkane (a) and/or the internal epoxyalkane (b) to the unsaturated fatty acid;
      with
      (ii) at least one of
         a mixture of one or more aromatic carboxylic compounds selected from the group consisting of phthalic anhydride, isophthalic acid, terephthalic acid, an ester of isophthalic acid and an ester of terephthalic acid and an aliphatic dicarboxylic acid having 3 or more carbon atoms or an anhydride thereof
      and
      (iii) a polyhydric alcohol containing 2 to 10 carbon atoms, wherein said at least one of reactants (i)(a), (i)(b), (i)(c) or (i)(d) is added to a mixture of said reactants (ii) and (iii) while heating
to thus form a polyester containing hydroxyl groups and having an acid value of about 5 or less, a hydroxyl value of about 40 to about 200 and an average molecular weight of about 600 to about 2,500, said reacting resulting in dehydroesterification;

(2) reacting the hydroxyl groups of the polyester with an aromatic polycarboxylic acid anhydride to adjust the acid value of the polyester to about 25 to about 80 and form a carboxyl group-containing alkyd resin; and (3) neutralizing the carboxyl group-containing alkyd resin with a base.

2. The process of claim 1, wherein the 1,2-epoxyalkane contains 10 to 18 carbon atoms.

3. The process of claim 1 or 2, wherein the unsaturated fatty acid is oleic acid, ricinoleic acid, linoleic acid, linolenic acid or eleosteric acid.

4. The process of claim 1 or 2, wherein the aliphatic dicarboxylic acid is adipic acid.

5. The process of claim 1 or 2, wherein the polyhydric alcohol is at least one member selected from the group consisting of neopentyl glycol, trimethylolpropane, glycerol and a mixture thereof.

6. The process of claim 3, wherein the polyhydric alcohol is at least one member selected from the group consisting of neopentyl glycol, trimethylolpropane, glycerol and a mixture thereof.

7. The process of claim 4, wherein the polyhydric alcohol is at least one member selected from the group consisting of neopentyl glycol, trimethylolpropane, glycerol and a mixture thereof.

8. The process of claim 1, wherein said 1,2-epoxyalkane has the general formula (I):

(I)

wherein n is an integer of from 3 to 25.

9. The process of claim 8, wherein said 1,2-epoxyalkane of the general formula (I) is 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytetradecane, 1,2-epoxyhexadecane and 1,2-epoxyoctadecane.

10. The process of claim 1, wherein the straight-chain internal epoxyalkane contains 8 to 14 carbon atoms.

11. The process of claim 1, wherein the straight-chain internal epoxyalkane has the general formula (II):

(II)

wherein p and m each represents 0 or a positive integer and p and m satisfy the relationship $2 \leq m+p \leq 16$.

12. The process of claim 1, wherein the aliphatic dicarboxylic acid or anhydride thereof is adipic acid, maleic acid or an anhydride thereof.

13. The process of claim 1, wherein said polyhydric alcohol is a dihydric alcohol, a trihydric alcohol or a tetrahydric alcohol.

14. The process of claim 1, wherein said polyhydric alcohol is ethylene glycol, propylene glycol, diethylene glycol, neopentyl glycol, glycerol, trimethylolethane, trimethylolpropane, pentaerythritol or diglycerol.

15. The process of claim 1, wherein the amount of the 1,2-epoxyalkane or straight-chain internal epoxyalkane or mixture thereof with the unsaturated fatty acid ranges from about 20 to about 50% by weight based on the weight of the water-soluble alkyd resin ultimately obtained.

16. The process of claim 1, wherein the reacting in step (1) is at a temperature of about 100° to about 250° C. and in the presence of a catalyst promoting the reaction.

17. The process of claim 16, wherein said catalyst is an amine, a quaternary ammonium salt, a phosphine compound or a complex of boron trifluoride and an ether or an amine and said catalyst is present in an amount of about 0.01 to about 5% by weight based on the weight of the 1,2-epoxyalkane or the straight-chain internal epoxyalkane.

18. The process of claim 1, wherein the reacting in step (2) is at a temperature of about 100° to 150° C.

19. The process of claim 1, wherein the neutralizing in step (3) is with a base selected from the group consisting of an alkylamine, an alcoholamine, a cyclic amine or an inorganic base.

20. The process of claim 19, wherein the neutralizing in step (3) is to a pH of about 7 to about 9.

21. A water-soluble alkyd resin produced in accordance with the process of claim 1.

22. A coating composition comprising the water-soluble alkyd resin of claim 21, an amino resin and a solvent.

23. The process of claim 1, wherein reacting to form the polyester of step (1) is performed by adding a solvent azeotroping with water and, while heating at about 150° to about 250° C. with stirring, water is removed from the reaction system, whereby said dehydroesterification proceeds.

24. The process of claim 23, wherein said solvent azeotroping with water is added in an amount of about 5 to 20% by weight.

25. The process of claim 24, wherein said solvent is xylene.

* * * * *